Feb. 7, 1956 K. W. COUSE 2,733,793
CLUTCH MECHANISM FOR A POWER TAKE-OFF APPARATUS
Filed April 21, 1952 5 Sheets-Sheet 1
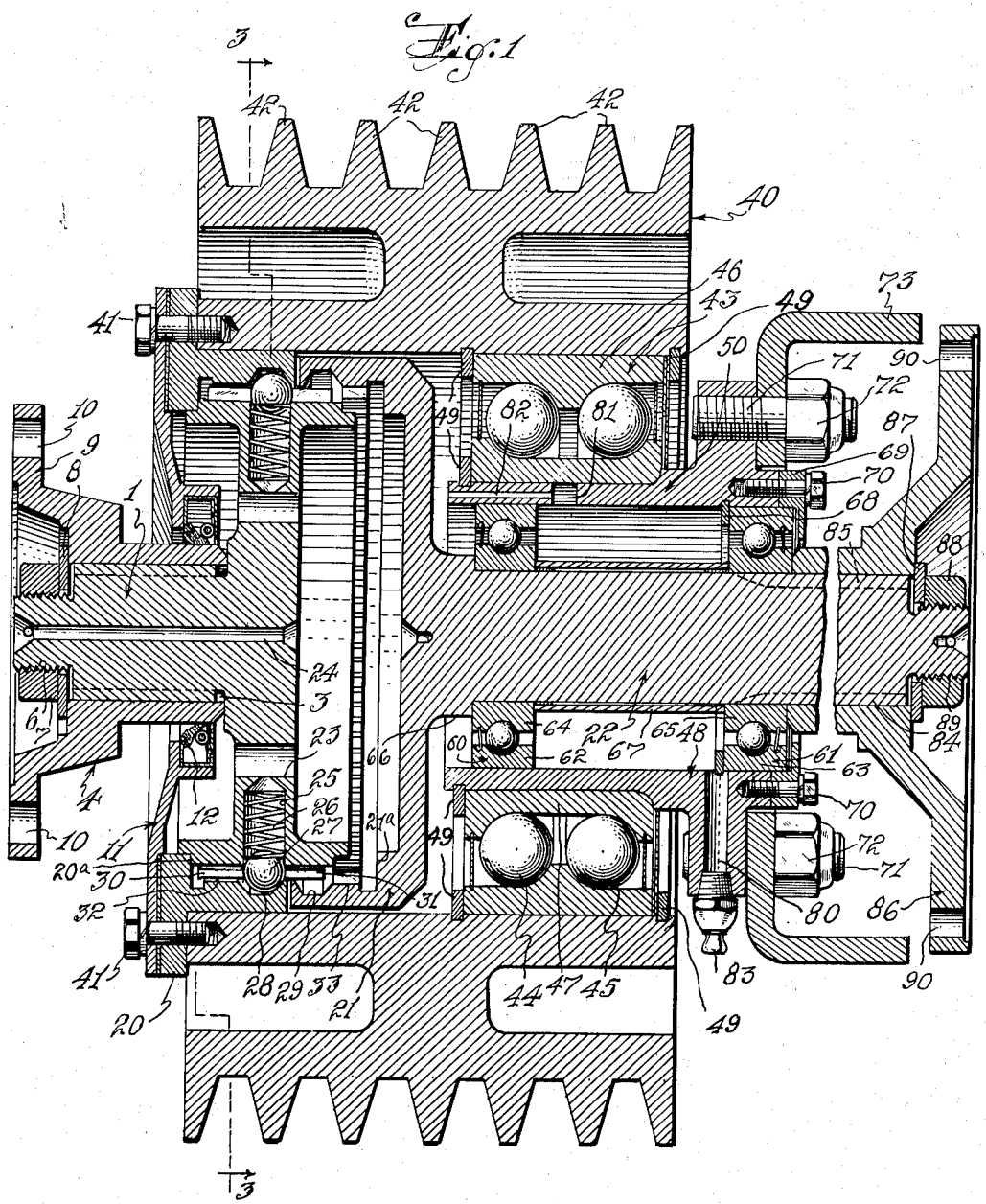
Inventor:
Kibbey W. Couse
BY
Attorney.

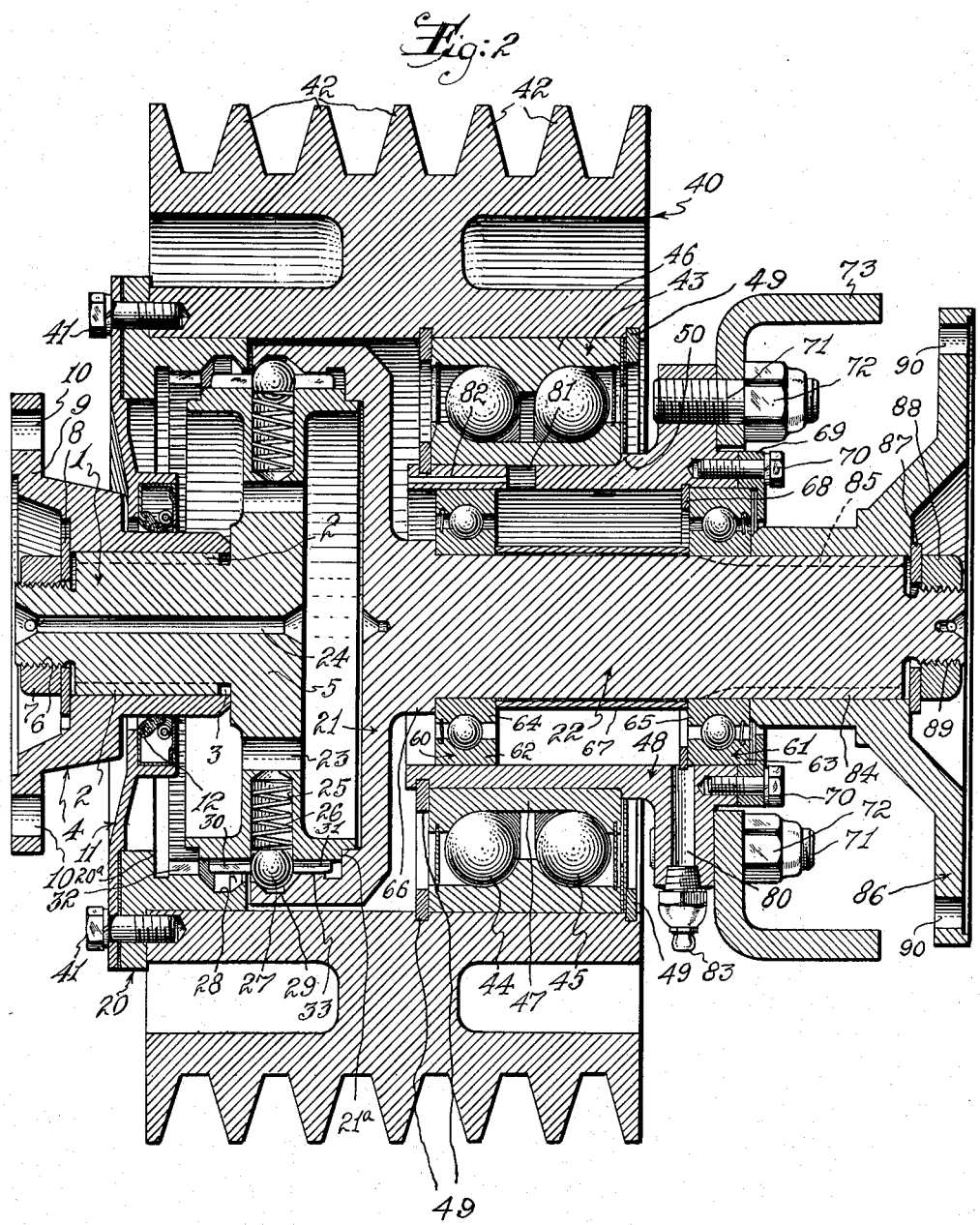

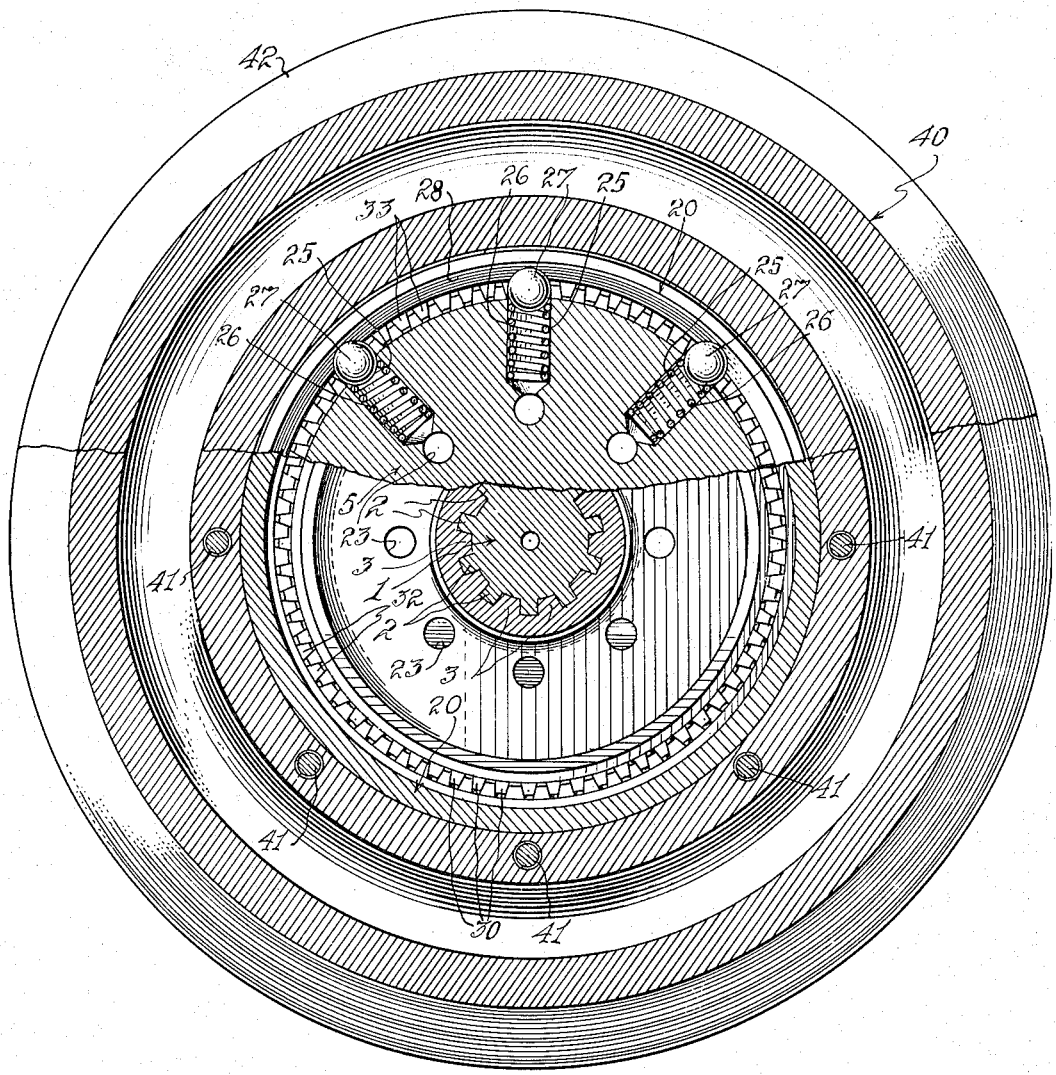

Feb. 7, 1956 K. W. COUSE 2,733,793
CLUTCH MECHANISM FOR A POWER TAKE-OFF APPARATUS
Filed April 21, 1952 5 Sheets-Sheet 4
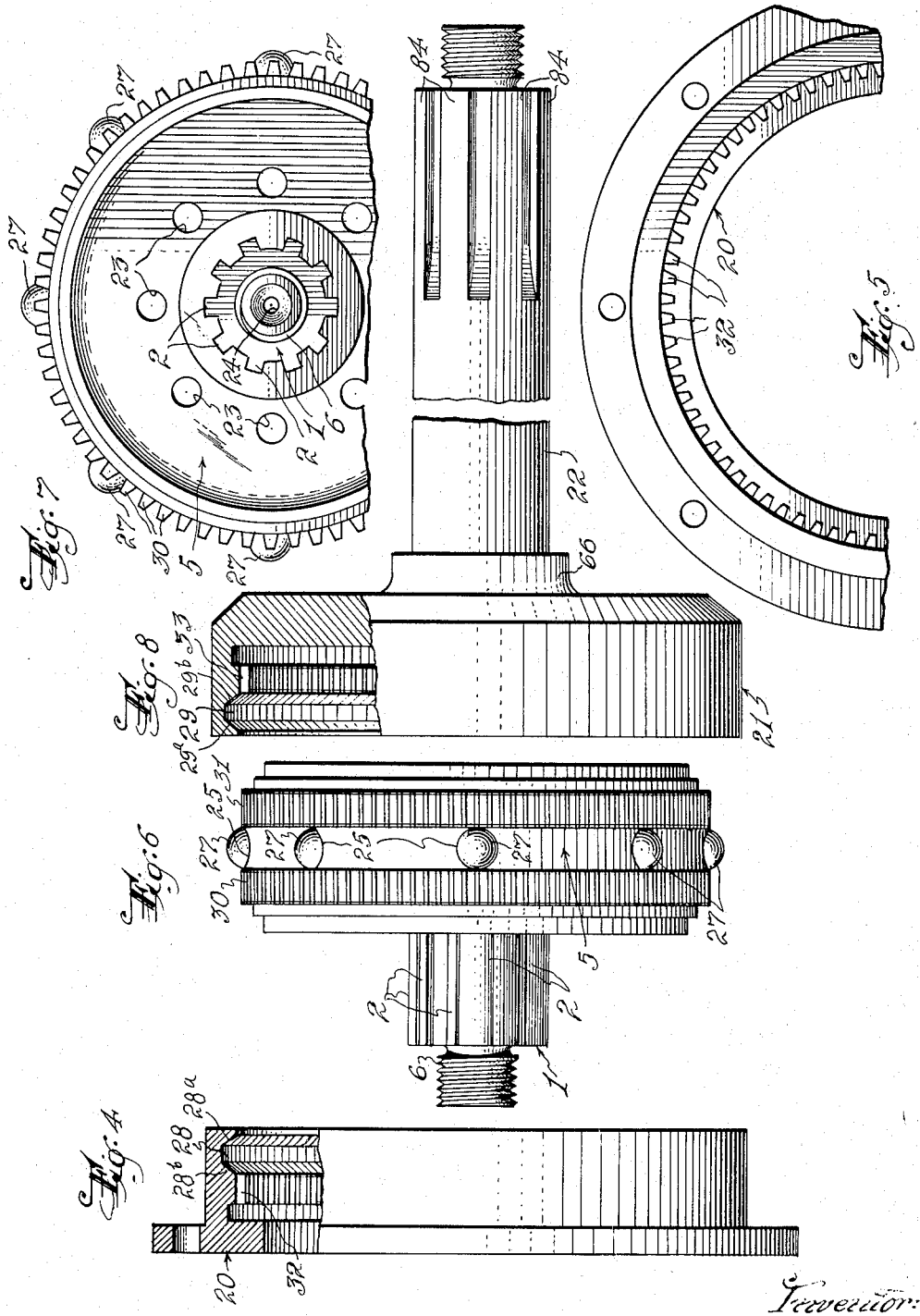

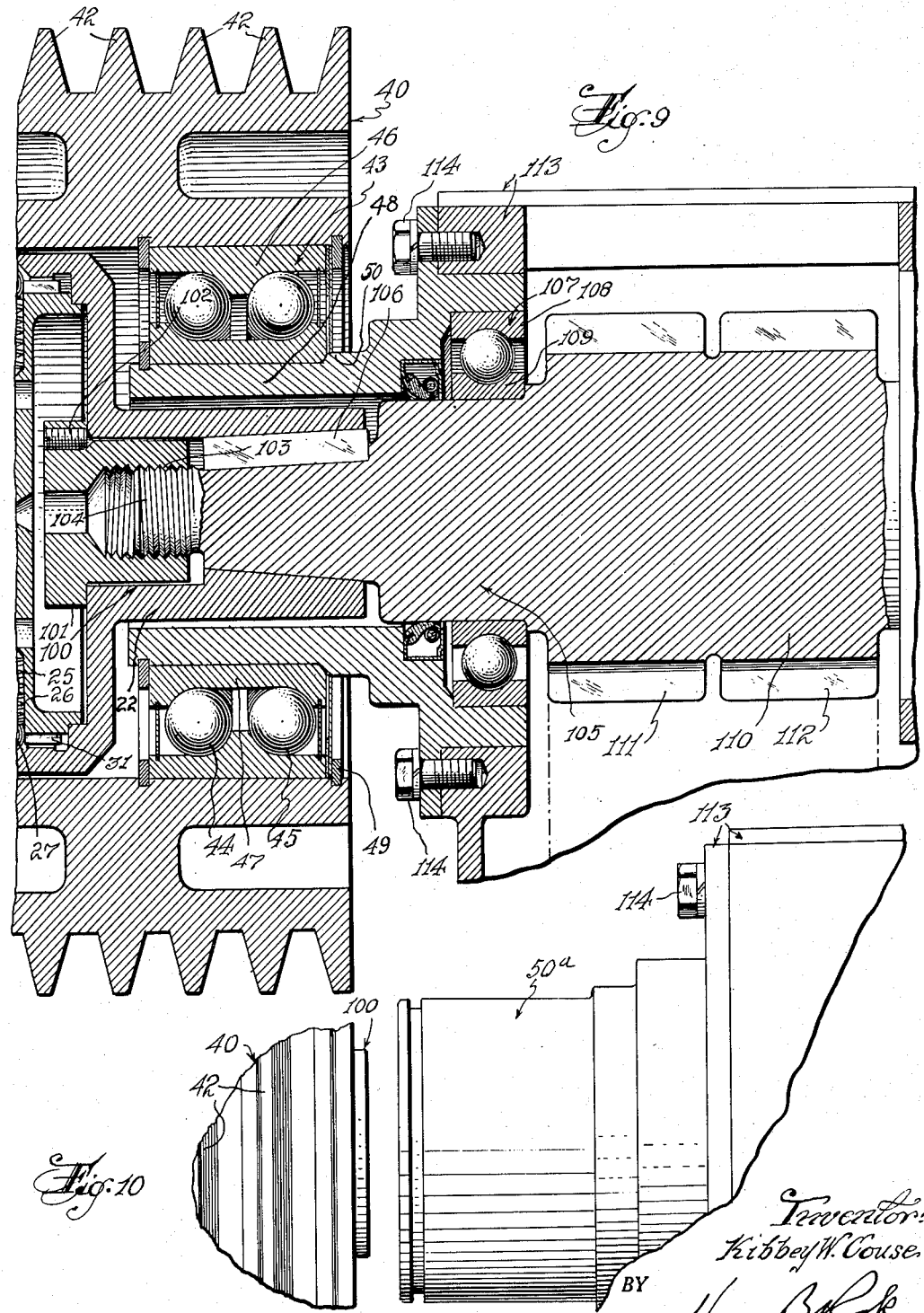

United States Patent Office 2,733,793
Patented Feb. 7, 1956

2,733,793

CLUTCH MECHANISM FOR A POWER TAKE-OFF APPARATUS

Kibbey W. Couse, Newark, N. J.

Application April 21, 1952, Serial No. 283,471

3 Claims. (Cl. 192—48)

My invention relates to power take-off apparatus which although useful in various environments is particularly adapted for use in traveling machine shops of the type illustrated in my Design Patent No. D–109,942, issued May 31, 1938, and including a motor vehicle adapted to carry power driven machines such as drill presses, grinders, milling machines and the like which are driven from the vehicle engine.

It is a prime object of my invention to provide power take-off apparatus having positive means for suitably locking the functioning parts together during the operation of the apparatus and for facilitating movement of the parts during a shifting operation.

It is another object of my invention to provide power take-off apparatus which lessens the friction between the parts and provides large and powerful driving areas in each of the shift positions of the apparatus.

Other objects and advantages of my invention will become apparent as the course of the specification progresses.

To attain the objects and advantages of my invention, I provide a power take-off apparatus having a driving member, a power transmitting member and a driven member. The driving member is adapted to drive the power transmitting member when such driving member occupies a first operative position and to drive the driven member when it occupies another operative position. The transmitting member is operatively connected to a power take-off drum. Means are provided for locking the driving and power transmitting members together when the driving member occupies its first operative position and for locking the driving and driven members together when the driving member occupies its other operative position.

I shall describe one form of my invention and point out the novel features thereof in claims.

In the accompanying drawings:

Fig. 1 is a longitudinal vertical section through the apparatus showing the driving member in position for operating the power take-off drum.

Fig. 2 is a view similar to Fig. 1 showing the driving member in position for operating the driven member.

Fig. 3 is a sectional view taken approximately on the line 3—3 of Fig. 1.

Fig. 4 is a side elevational view partly in section of the power transmitting member of the apparatus.

Fig. 5 is a partial end view of the power transmitting member of Fig. 4.

Fig. 6 is a side elevational view of the driving member.

Fig. 7 is a partial end view of the driving member of Fig. 6.

Fig. 8 is a side elevational view partly in section of the driven member.

Fig. 9 is a longitudinal vertical section of a modified form of my power take-off apparatus.

Fig. 10 is a side elevational view of a portion of the structure shown in Fig. 9.

Similar reference characters refer to similar parts in each of the several views.

Referring to the drawings, reference character 1 designates a driving member having a plurality of splines 2 formed on its surface for engagement by a plurality of other splines 3 on coupling member 4 so that driving member 1 may be rotated by coupling member 4. Driving member 1 has a hub section 5 at one end and a threaded portion 6 at its other end. Coupling member 4 is held by nut 7 in a fixed longitudinal position on driving member 1 between hub section 5 and washer 8. Coupling member 4 has a flange 9 which includes a plurality of openings 10 through which bolts may be inserted to operatively connect driving member 1 to a drive shaft and to suitable means for shifting the driving member longitudinally to one or another of its operative positions. Coupling member 4 is moved longitudinally during a shifting operation through an opening in cover plate 11 provided with suitable packing means 12, and of course driving member 1 is moved with coupling member 4. Hub section 5 of driving member 1 is slidable within a hollow cylindrical end section of a power transmitting member 20 and a hollow cylindrical end section 21 of a coaxial juxtaposed driven member 22. In this connection it is to be noted that hub section 5 has a plurality of openings 23 formed therein which permit air to escape from one side of hub section 5 to the other side thereof during shifting operations so that no undue compression results to hamper the movement of driving member 1 incident to a shifting operation. Driving member 1 is also provided with a central opening 24 extending throughout its length to permit any air compressed by hub section 5 during shifting operations to escape to the outer atmosphere.

Hub section 5 has a plurality of radial openings 25 formed therein and fitted into each such opening is a coil spring 26. The outer end of each spring engages a ball 27 which is positioned by its associated spring in an interior annular or circumferential recess 28 formed in power transmitting member 20 or in another interior annular or circumferential recess 29 in cylindrical section 21 of driven member 22 according to the position occupied by driving member 1. Annular recess 28 is provided with beveled sides 28a and 28b, one of which is near the end of the corresponding hollow end section that is juxtaposed to the hollow end section of the power transmitting member; and annular recess 29 is provided with beveled sides 29a and 29b, one of which is near the end of the hollow section that is juxtaposed to the end of the hollow end section of the power transmitting member. When driving member 1 is moved inwardly of the hollow end section of the power transmitting member 20, it occupies a first position in which position hub 5 engages power transmitting member 20 at 20a, each ball 27 is positioned in recess 28 where it contacts but one side of the recess, namely side 28a. The engagement of hub 5 with power transmitting member 20 at shoulder 20a that is spaced from the side 28a inwardly of the hollow end section of the power transmitting member 20, and the engagement of each ball 27 with side 28a of recess 28 locks driving member 1 in its first operative position until intentionally displaced therefrom. When driving member 1 is moved inwardly of the hollow end section of driven member 22, it occupies another operative position in which position hub 5 engages driven member 22 at shoulder 21a that is spaced from the side 29a inwardly of the hollow end section of the driven member 22 and each ball 27 is positioned in recess 29 being in contact with only side 29a. Driving member 1 is locked in the latter operative position by the engagement of hub 5 with driven member 22 at 21a and the engagement of each ball 27 with side 29a until driving member 1 is forced back to its first operative position. Formed on hub section 5 of driving member 1 on one side of openings 25 are clutch teeth 30, hub section 5 having other clutch teeth 31 formed thereon on the other side of openings 24. Cylindrical power transmitting member 20 and cylindrical section 21 of driven member 22 are provided on their inner surfaces with clutch teeth 32 and 33 respectively, clutch teeth 32 being adapted for engagement by clutch teeth 30 when driving member 1 occupies its first operative position and clutch teeth 33 being adapted for engagement by clutch teeth 31 when driving member 1 occupies its other operative position. It will be noted that while driving member 1 is positioned to actuate power transmitting member 20 in its first operative position, driving member 1 is completely disconnected in such first operative position from driven member 22. In its other operative position driving member 1 is positioned for the actuation of driven member 22 but it is completely disconnected from power transmitting member 20.

Power transmitting member 20 is connected to power take-off drum 40 by screw studs 41 so that drum 40 is caused to be rotated when power transmitting member 20 is rotated. It is to be noted that screw studs 41 serve to secure cover plate 11 to power transmitting member 20. Drum 40 is adapted to receive a suitable type of power transmitting means and may as illustrated in the drawing have its outer surface divided into V-shaped sections 42 spaced to receive a V-type belt not shown. Drum 40 is supported by ball bearing 43 having a double row of balls 44 and 45. Ball bearing 43 has its outer race 46 in contact with the inner surface of drum 40 and its inner race 47 in contact with the outer surface of cylindrical bearing carrying member 48, the bearing 43 being held in a fixed position longitudinally by retaining rings 49 and hub 50 on member 48. Interposed between the inner surface of member 48 and driven member 22 are ball bearings 60 and 61 which have their outer races 62 and 63 in contact with member 48 and their inner races 64 and 65 in contact with driven member 22. Thus driven member 22 is rotatable within bearings 60 and 61. Bearing 60 occupies a fixed longitudinal position determined by hub 66 on driven member 22, and cylindrical spacer 67. Bearing 61 occupies a fixed longitudinal position determined by cylindrical spacer 67 and plate 69 located on the other side. Plate 69 is secured to member 48 by screw studs 70. Secured upon member 48 by bolts 61 and lock nuts 72 is a supporting channel member 73. Member 48 is provided with openings 80, 81, and 82 to render possible the proper lubrication of the aforesaid bearings, opening 80 which extends to the outer surface of bearing member 48 being provided with a removable plug 83.

Driven member 22 has a plurality of splines 84 formed thereon which are engaged by a plurality of other splines 85 on a coupling member 86 which coupling member is positioned in a fixed longitudinal position between bearing 71 and washer 87 by a nut 88 tightened on threaded end 89 of driven member 22. Coupling member 86 is provided with a plurality of openings 90 through which bolts may be inserted for operatively connecting driven member 22 to a shaft to be controlled by my power take-off apparatus.

In the modification of my invention shown in Figs. 9 and 10, driven member 22 has a hollowed section 100 and inserted in one end of such hollowed section is a plug 101 which is held in position by set screw 102. Plug 101 has a threaded opening 103 adapted to receive the threaded end 104 of a secondary driven member 105. Member 105 has its threaded end 104 screwed into threaded opening 103 of plug 101 where it remains during the operation of the apparatus being restrained against rotation with respect to plug 101 and driven member 22 by a key 106 engaging suitable keyways in driven member 22 and secondary driven member 105. Member 105 is of course caused to rotate when driven member 22 is rotated. In place of bearings 60 and 61 shown in Figs. 1 and 2, I provide a single bearing 107 somewhat larger than bearings 60 and 61, for secondary driven member 105. The outer race 108 of member 105 contacts bearing carrying member 48 and the inner race 109 contacts member 105. Secondary driven member 105 includes an enlarged portion 110 having gear teeth 111 and 112 formed thereon suitable for driving gears secured upon a shaft to be controlled through my apparatus, thus rendering this modified form of my invention particularly suitable for the control of a shaft which is offset from driven shaft 22 and driving member 1. In this modified form of my invention bearing carrying member 48 is adapted for the securing of a housing 113 thereto by screw studs 114.

In both forms of my invention, a shift operation is accomplished by moving driving member 1 longitudinally by suitable shifting means operatively connected thereto through connecting member 4. When driving member 1 occupies its first operative position (Fig. 1) as determined by the shifting means balls 27 are positioned in recess 28 of power transmitting member 20 as already noted and clutch teeth 30 on driving member 1 are positioned to engage clutch teeth 32 on power transmitting member 20 so that power transmitting member 20 and drum 40 secured thereto may be rotated by driving member 1. Driving member 1 is locked in its first operative position in the manner already noted. When driving member 1 is moved from its first operative position to its other operative position, driving member 1 is moved to the right as viewed in Fig. 1, balls 27 being pushed inwardly in the process by side 28a of recess 28 compressing coil springs 26, but when driving member 1 reaches its other operative position (Fig. 2), coil springs 26 snap balls 27 into position in recess 29 of cylindrical section 21 and in contact with side 29a of recess 29. In such other operative position of driving member 1, clutch teeth 31 of driving member 1 are positioned for engagement with clutch teeth 33 of cylindrical section 21, thus permitting driven member 22 to be rotated by driving member 1. Driving member 1 is held in its other operative position in the manner hereinbefore noted. Balls 27 are of course also pushed inwardly by side 29a of recess 29 compressing spring 26 when the driving member is moved from the aforesaid other operative position back to its first operative position, the balls 27 being snapped into position in recess 28 in power transmitting member 20 and in contact with side 28a of recess 28 when the first operative position is attained.

It will now be apparent that I have provided a power take-off apparatus having a driving member, a power transmitting member which is operatively connected to a power take-off drum, and a driven member. The driving member is positioned to drive the power transmitting member when such driving member occupies a first operative position in which position the driving member is completely disconnected from the driven member. When the driving member occupies its other operative position, the driving member is positioned to drive the driven member. In such other operative position the driving member is disconnected from the power transmitting member. It will be noted that means have been provided for locking the driving and power transmitting members together when the driven member occupies its first operative position and for locking the driving and driven members together when the driven member occupies its other operative position.

Although I have herein shown and described only two forms of my invention, it is to be understood that various changes and modifications may be made therein within the scope of the appended claims without departing from the spirit and scope of my invention.

What I claim is:

1. Power take-off apparatus comprising the combination of a driving member, a power transmitting member and a driven member, said power transmitting and said driven member having hollow end sections coaxial with each other and with said driving member, each hollow end section having one end coaxially and closely juxtaposed to one end of the other hollow end section, said driving member being axially movable in said hollow end sections relatively to said power transmitting member and said driven member and having an opening, means for selectively effecting a driving engagement between said driving member and either of said power transmitting element and said driven element, a spring fitted into said opening, said power transmitting member and said driven member each having an interior recess formed in its said hollow end section near said end of the hollow end section with a beveled side whose outer edge is in close proximity to the corresponding edge of the other recess and also having a shoulder spaced from said side inwardly of the corresponding hollow end section to limit movement of said driving member inwardly of the corresponding hollow end section, and a detent member in said opening of the driving member urged by said spring so that said detent member is compelled to snap into one or the other of said recesses upon slight axial movement of said driving member and is pressed into engagement with one or the other of said sides depending upon the position of said driving member to lock the driving member between said side and said shoulder of the corresponding power transmitting member or driven member in a position of driving engagement with one or the other of said power transmitting member and said driven member.

2. Power take-off apparatus as defined in claim 1 wherein each of said recesses is an interior circumferential groove, said driving member has a plurality of said openings in a circumferential row with a spring in each thereof, the member engaged by each spring is a ball, and the means for selectively effecting a driving engagement between the said driving member and either of said power transmitting member and said driven element comprises circumferentially spaced clutch teeth at each side of said row of balls on the driving member and clutch teeth on the interior of said hollow section of each of the power transmitting member and said driven member to receive the teeth on the driving member upon axial movement of the driving member in opposite directions respectively.

3. Power take-off apparatus as defined in claim 1 with the addition of a tubular bearing supporting structure in which said driven member is journaled, said tubular bearing supporting structure having an exterior bearing on which said power transmitting member is journaled whereby said driving member can be drivingly engaged with either of said power transmitting element and said driven member without affecting the other of said driven member and power transmitting member.

References Cited in the file of this patent

UNITED STATES PATENTS

| | | |
|---|---|---|
| 2,032,088 | Gustafson | Feb. 25, 1936 |
| 2,379,776 | Young | July 3, 1945 |
| 2,390,513 | Couse | Dec. 11, 1945 |
| 2,398,407 | Brounyer | Apr. 16, 1946 |
| 2,460,295 | Keech | Feb. 1, 1949 |
| 2,493,132 | Greiner | Jan. 3, 1950 |

FOREIGN PATENTS

| | | |
|---|---|---|
| 562,974 | Great Britain | July 22, 1944 |